Sept. 20, 1927.
C. L. FISCHER
MOLD
Filed Jan. 31, 1927
1,642,947
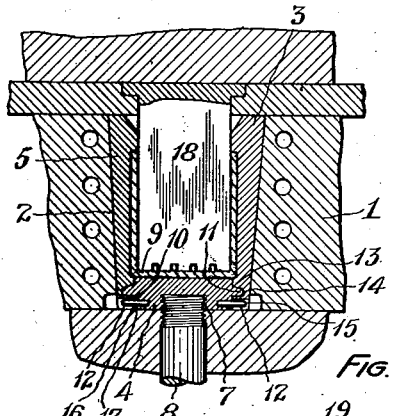
FIG. 1.
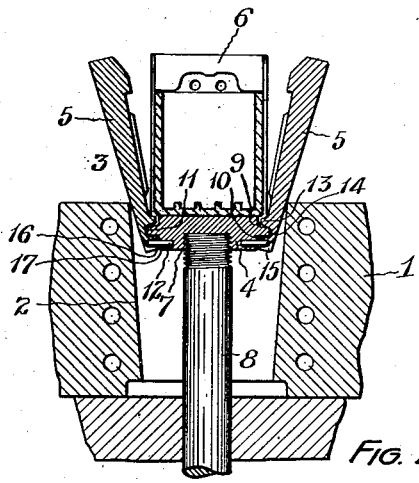
FIG. 2.
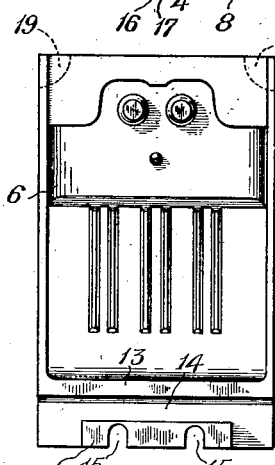
FIG. 3. FIG. 4.
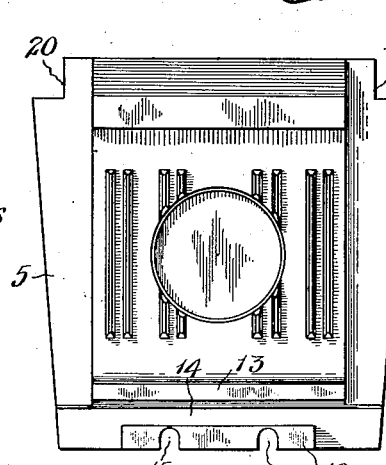
FIG. 5.
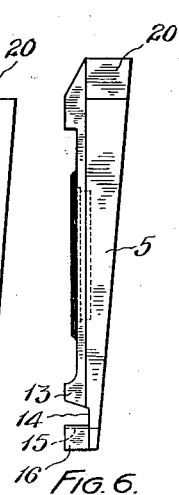
FIG. 6.
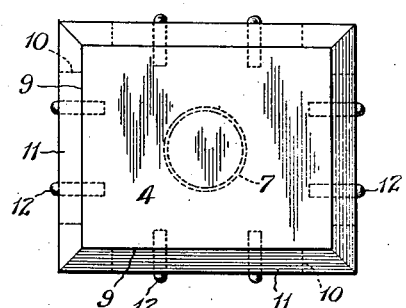
FIG. 8. FIG. 7.
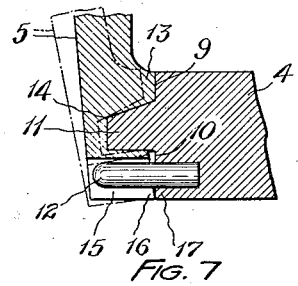
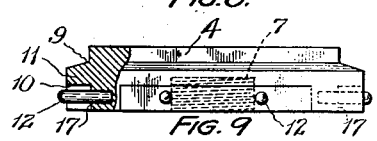
FIG. 9.
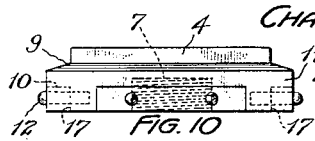
FIG. 10.
INVENTOR:
CHARLES L. FISCHER
BY Merker & Underwood
ATTORNEYS.

Patented Sept. 20, 1927.

1,642,947

UNITED STATES PATENT OFFICE.

CHARLES L. FISCHER, OF CLEVELAND, OHIO, ASSIGNOR TO THE GOLIATH RUBBER COMPANY, OF CLEVELAND, OHIO, A CORPORATION OF OHIO.

MOLD.

Application filed January 31, 1927. Serial No. 164,715.

My invention relates to molds and more particularly to molds adapted to form articles such as battery boxes in a cold pressing operation.

According to prior practice a mold casting was provided with a frusto-conical cavity rectangular in cross-section adapted to receive a collapsible mold, the separable sides and ends of the mold being wedge-shaped in vertical section so as to form a mold cavity with parallel inner faces and converging outer faces. The separable sides and end members of the mold, were loosely connected with a bottom plate of the mold so that when the mold was lifted in the mold cavity to a position near the top, the side and end members could be moved laterally, pivoting on the bottom, to separate them from the article molded, whereby the latter could be removed by lifting it upwardly. The upward and downward motion of the mold was effected by an ejector bar threaded into the lower face of the mold bottom, which was in turn connected with a knock-out beam operated by power means. In apparatus of this kind, molding is effected by inserting a given mass of plastic or semi-plastic material into the mold and then projecting thereinto a plunger or male die by hydraulic or other means capable of producing great pressure, whereby the material is caused to flow into the space between the outer faces of the plunger and the inner faces of the mold. As a result of the great force required to press the material into shape, some of it is pressed through the joints at the bottom of the mold and finally collects to such an extent as to prevent the formation of a perfect product. In order to remove such material (called a "flash") it has heretofore been necessary to disconnect the mold from the press, which was most conveniently done by disconnecting the ejector bar from the knockout beam. But this operation was tedious, requiring a matter of hours to disconnect and again connect the parts, and necessarily putting the press out of operation for that period.

It is the object of this invention to materially shorten the time required to clean a mold of the character indicated, and thereby effect economy in labor and overhead.

The invention consists in the means hereinafter described and illustrated in the accompanying drawings and pointed out in the appended claims.

In the annexed drawings:

Figure 1 is a vertical section through a mold constructed in accordance with my invention.

Fig. 2 is a similar section through the lower half of the mold showing it in its uppermost position and with the side and end plates in position to permit the molded article to be removed.

Figs. 3 and 4 are inside and end elevations, respectively, of the end plates of the mold.

Figs. 5 and 6 are similar views of the side plates.

Fig. 7 is a vertical section, on an enlarged scale, through the bottom plate and a side plate, showing two positions of the side plate.

Fig. 8 is a top plan view of the bottom plate.

Fig. 9 is a side elevation of Fig. 8.

Fig. 10 is an end elevation of Fig. 8.

Referring to the drawings in detail in which the same reference number is employed throughout to designate the same part, the mold press is provided with a casting 1 in which is formed a downwardly-converging frusto-conical recess 2, rectangular in horizontal cross-section. This recess is adapted to receive a mold 3 which consists of a bottom plate 4, side plates 5 and end plates 6. The side and end plates are wedge-shape in vertical cross-section so that when drawn into the recess 2 the outer faces thereof will be in snug engagement with the walls of the recess while the inner faces of the side members will be parallel and at right angles to the inner faces of the end members, as clearly shown in Fig. 1. The lower face of the bottom plate is provided with a threaded recess 7, into which is threaded the upper end of an ejector bar 8 which extends downwardly through the frame of the press and is detachably connected to a knockout beam (not shown), operated by hydraulic power, to move the mold plates upwardly and downwardly.

The bottom plate 4 has a marginal rabbet 9 on its upper face and a marginal rabbet 10 on its lower face, forming an outwardly projecting tongue 11 which is downwardly beveled on its upper face, as shown in Fig. 7. Secured to the bottom plate on each of its sides and below the tongue 11 are a plurality of pins 12 which project beyond the outer edge of the tongue for a purpose hereinafter described. Each of the side and end plates is provided at its lower edge with a thickened portion 13 having a groove 14, and in the lower edge are formed open slots 15 adapted to engage the pins 12. The grooves 14 are adapted to engage the tongue 11 and are beveled correspondingly with the tongue. When the side and end plates are assembled with the bottom plate the upper wall of the groove 14 is engaged with the upper beveled surface of the tongue 11, with the lower inner edge 16 of the plates in substantial engagement with the lower outer edge 17 of the bottom plate 4.

Mounted in the mold press above the parts described for vertically reciprocating movement under hydraulic pressure is a plunger 18 which is adapted to enter the mold and force the plastic material inserted therein into the space between the plunger and the mold to shape it to the desired form. As illustrated, the mold is adapted to form a battery box, and the sides and end plates are therefore formed on the inside faces with the contour which the outside of the box is to take and the plunger 18 is shaped to form the inside of the box. For this reason the plunger is provided with deep grooves which form partitions across the box from side to side.

While all the parts shown in Figs. 1 and 2, properly speaking, constitute the lower part of a mold, and the plunger 18 constitutes the upper part thereof, for convenience the bottom plate 4, and side and end plates, 5 and 6, are, in the description and claims, called a "mold."

The operation of the parts described is as follows:

When the mold is seated in the recess 2, as shown in Fig. 1, and the plunger is elevated, the plastic or semi-plastic material to be molded is inserted in the cavity bounded by the mold plates. The plunger 18 is then lowered and pressed into the mold space under hydraulic pressure which causes the material to flow and fill the space between the plunger and mold plates. After remaining for a short time while being subjected to the action of a cooling medium such as water circulated in apertures in the mold casting surrounding the recess 2, the plunger is withdrawn, after which the mold plates are lifted until the bottom plate 4 is near the upper edge of the recess 2, as shown in Fig. 2. Because of the tapering sides of the recess 2 the side and end plates will, in the position stated, be separated from the sides of the recess. The operator inserts a tool in the recess 19 in the upper corner of the end plates which lie adjacent to a notch 20 in the upper corners of the side plates, and pries the side plates away from the molded box. The end plates are then separated from the box which may be lifted directly upwardly and removed from the mold. When the upper end of the mold plate is moved outwardly the lower edge 16 thereof engages the outer lower edge 17 of the bottom plate, as indicated in Fig. 7, and forms a fulcrum upon which the plate pivots, the beveled face of the groove 14 sliding outwardly over the engaging beveled upper surface of the tongue 11. As soon as the plate is separated from the molded article its own weight will cause it to slide outwardly and downwardly over the beveled surface of the tongue 11 until the closed ends of the slots 15 engage the pins 12.

As indicated above, the object of the invention is to permit ready disassembling of the mold plates to permit the removal of the "flash." The side and end plates may easily be removed from the bottom plate when the parts are in their uppermost position, as indicated in Fig. 2, for it may be observed from this figure that when the plates are moved to a vertical position the lower ends thereof may be moved laterally sufficiently to disengage the tongue and groove to permit them to be drawn out by a vertical movement; at the same time they cannot, at any time, drop down into the recess 2 because the pins 12 project outwardly beyond the outer edge of the tongue on the bottom plates. The function of the pin and open slot connection between the lower edges of the side and end plates is therefore to permit the removal of the plates upwardly but to prevent their falling into the mold recess. After the side and end plates have been removed the "flash" may be removed and all the plates may be thoroughly cleaned without disassembling the parts, as has been necessary heretofore.

The rabbet 10 in the bottom plate might extend from edge to edge so as to form a continuous rabbet, but for the purpose of giving the bottom plate the desired strength it is preferred that it should stop short of the edge so as to provide the bottom plate with solid corners, as clearly shown in Figs. 8, 9, and 10, and the lower edges of the side and end plates are correspondingly formed.

While I have disclosed but one embodiment of the invention, it is obvious that many changes and modifications may be made without departing from the spirit of the invention. It is therefore to be understood that my invention is not to be confined to the details shown but comprehends all structures falling within the terms of the appended claims.

What I claim is:

1. A mold for battery boxes and the like comprising a bottom plate provided with a tongue on each of its edges, supporting means secured to the bottom plate beneath the tongues and projecting outwardly, interfitting side and end plates each having at its lower end a groove fitting said tongue, and means on the said plates detachably interlocking with said supporting means.

2. A mold for battery boxes and the like comprising a bottom plate provided with a tongue at each of its edges, pins secured to the edges of the bottom plate projecting beyond said tongues, and interfitting side and end plates each having open slots at its lower edge cooperating with said pins and a groove interfitting with one of said tongues.

3. The combination specified in claim 1 in which the tongues have a downwardly and outwardly beveled upper face and the upper faces of the grooves in the side and end plates are correspondingly beveled.

4. The combination specified in claim 2 in which the pins are so positioned with respect to the upper face of the tongue that the plates are out of engagement with the pins when the tongues and grooves are in complete engagement.

5. The combination specified in claim 2 in which the tongues on the bottom plate have an outwardly and downwardly beveled upper face and the grooves in the side and end plates are correspondingly beveled and the pins are so positioned that the side and end plates are out of engagement therewith when the tongues and grooves are in complete engagement.

Signed by me this fifteenth day of January, 1927.

CHARLES L. FISCHER.